(12) United States Patent
Diaz Berrade

(10) Patent No.: US 10,190,670 B2
(45) Date of Patent: Jan. 29, 2019

(54) TORQUE ABSORBER FOR WIND TURBINE GEARBOXES

(71) Applicant: GAMESA INNOVATION & TECHNOLOGY, S. L., Sarriguren (Navarra) (ES)

(72) Inventor: David Diaz Berrade, Sarriguren (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 0 days.

(21) Appl. No.: 15/337,626

(22) Filed: Oct. 28, 2016

(65) Prior Publication Data
US 2017/0152932 A1    Jun. 1, 2017

(30) Foreign Application Priority Data
Nov. 26, 2015    (ES) .................................. 201500844

(51) Int. Cl.
| | |
|---|---|
| *F16H 57/025* | (2012.01) |
| *F16F 15/02* | (2006.01) |
| *F16H 57/00* | (2012.01) |
| *F03D 15/00* | (2016.01) |
| *F03D 80/00* | (2016.01) |
| *F03D 80/70* | (2016.01) |

(52) U.S. Cl.
CPC .......... *F16H 57/025* (2013.01); *F03D 15/00* (2016.05); *F03D 80/00* (2016.05); *F16F 15/02* (2013.01); *F16H 57/0006* (2013.01); *F03D 80/70* (2016.05); *F05B 2260/30* (2013.01); *F05B 2260/964* (2013.01); *Y02E 10/722* (2013.01)

(58) Field of Classification Search
CPC .. F16H 57/028; F16H 57/025; F16H 57/0006; F03D 80/00; F16F 15/02; F05B 2260/30; F05B 2260/964
See application file for complete search history.

(56) References Cited

U.S. PATENT DOCUMENTS

| | | | |
|---|---|---|---|
| 2010/0276932 A1* | 11/2010 | Numajiri | F03D 7/02 290/52 |
| 2012/0056071 A1 | 3/2012 | Michalski | |
| 2014/0301846 A1* | 10/2014 | Zhu | F03D 7/0296 416/146 R |

(Continued)

FOREIGN PATENT DOCUMENTS

EP    1197677 A2 *    4/2002    ............. F16F 15/08

OTHER PUBLICATIONS

Traslation EP1197677.*

*Primary Examiner* — Vicky A Johnson
(74) *Attorney, Agent, or Firm* — Ladas & Parry LLP

(57) ABSTRACT

Torque absorber for wind turbine gearboxes, comprising a pair of torque arms configured to be coupled on one side to a pair of corresponding protrusions of a gearbox and on the other side to a fixed frame. Each torque absorber comprises at least one pair of ridges that externally embrace the corresponding protrusion; wherein a first absorbing element is located between the ridges and in contact with both the torque absorber and the protrusion of the gearbox; and wherein a second absorbing element is located between the ridges in contact with both the torque absorber and the fixed frame, defining a cushioned union between both components.

6 Claims, 5 Drawing Sheets

(56) References Cited

U.S. PATENT DOCUMENTS

2015/0007693 A1\* 1/2015 Trede ................ F03D 80/70
 74/606 R
2015/0069762 A1\* 3/2015 Mashtare ............ F03D 11/0091
 290/55

\* cited by examiner

TORQUE ABSORBER FOR WIND TURBINE GEARBOXES

TECHNICAL FIELD OF THE INVENTION

The present invention relates to a torque absorber for wind turbine gearboxes, pertaining to the renewable wind energy sector, as well as periodic maintenance and repair operations for said wind turbines.

The torque absorber that is the subject matter of the invention has the main purpose of absorbing, inasmuch as possible, the reaction torque generated in the gearbox to a wind turbine frame, such that a cushioned union exist between the frame and said gearbox that can absorb said reaction torque, and where the union has a series of parts that are easy to install and replace, economically competitive, and fully adaptable to currently existing wind turbines.

BACKGROUND OF THE INVENTION

By way of introduction, the wind turbines currently used comprise a gearbox to multiply the rotational speed of the output shaft, which is coupled directly to the rotor shaft of the wind turbine blades. As indicated, the main purpose of said gearbox is increasing the rotational speed at the output shaft, reducing the torque. This allows to reduce the size of the associated electric power generator and consequently to decrease the overall cost thereof.

Said gearbox is in turn coupled to a frame meant to support the box itself and the wind turbine rotor, such that the torque reduced by the gearbox is transmitted to the frame, which reacts under Newton's third law to produce a reaction torque ($M_{react}$) directly proportional to the input torque ($M_{input}$) and to the ratio of the rotation speed at the output and input shafts (i). Where the reaction torque can be calculated as:

$$M_{react} = M_{input} \cdot i - 1/i$$

It is known in this context to apply physical bodies related to one another and configured to absorb part of said reaction torque, where said application employs a pair of torque absorbers coupled on one side to the gearbox and on the other to the support frame. Said torque absorbers include absorbing elements that allow absorbing part of said reaction torque, increasing the durability of the rotational speed gearbox and thereby reducing maintenance and/or repair costs.

See for example US patent application publication number US-2012/0056071, which describes a pair of torque absorbers associated to the housing of a gearbox, which provide an elastic union between said gearbox and the associated fixed frame. In general, said torque absorbers have the following components:

On one side there are brackets bolted to the gearbox housing.
On the other side there are bridges that are bolted to the frame. Between these two components are shock absorbers that absorb part of the torque generated in the gearbox and prevent said torque from being transmitted to the bridges and thereby to the corresponding frame.

In this way, the main goal of reducing the transmission of the torque generated in the gearbox to the frame is achieved. However, it should be noted that said torque absorbers have a number of drawbacks associated with:

First, a great number of elements are needed to absorb the reaction torque generated by the gearbox, as it is necessary to have the brackets and bridges, and between these the absorbing elements needed to absorb the torques generated; moreover, in addition to these physical components the torque absorbers comprise several spacers configured to predetermine a distance or working height of the torque on which the absorbing element operates.

Second, it should be noted that said torque absorbers require frequent servicing, as the absorbers suffer from wear or cracks, and must be repaired or replaced accordingly. However, the location of said absorbing elements between the bracket and bridge with the spacers surrounding part of the access means that handling said elements is a complex and laborious task for skilled workers, substantially increasing the replacement time required due to the need to disassemble a great number of parts of the torque absorber until reaching the absorbers that must be replaced or repaired.

Moreover, it is noted that due to the different manufacturing tolerances for each part included in each torque absorber, which cause variations in the positioning and proper attachment of each torque absorber on the corresponding gearbox and frame, it is common practice to use gauges to ensure a correct support and preload of the torque absorber. Once again, said gauges are installed near the absorbing elements, and access to the same is again complicated.

In view of the above-described drawbacks related to the large number of elements conforming current torque absorbers, as well as the difficulty of installation, maintenance and/or replacement thereof, it is necessary to provide a new torque absorber for wind turbine gearboxes that can be installed in any wind turbine, ensuring the absorption of the reaction torque generated in the gearbox, cushioning the transmission of said torque to the frame; said new absorber must also comprise a small number of simple and economic to manufacture parts, and allow access to the absorbing and height adjustment elements in a quick and effective manner. This should be provided by a novel torque absorber that is easy to install and maintain, and economically competitive regarding the known prior art.

DESCRIPTION OF THE INVENTION

The present invention relates to a torque absorber for wind turbine gearboxes, comprising a pair of torque absorbers configured to be coupled on one side to a pair of corresponding protrusions of a gearbox and on the other side to a fixed frame, such that:

each torque absorber comprises at least one pair of ridges that externally embrace the corresponding protrusion;
wherein a first absorbing element is located between said ridges and in contact with both the torque absorber and said protrusion of the gearbox, defining a cushioned union between each protrusion and the corresponding torque absorber through said first absorbing element; and
wherein a second absorbing element is located between said ridges and in contact with both the torque absorber and the fixed frame, defining a cushioned union between each protrusion and the fixed frame through said second absorbing element.

Thus, the union of the gearbox to the frame is performed because each torque absorber comprising a single part, which has a pair of ridges that embrace one of the protrusions of the gearbox, and where each pair of ridges have a first and second absorbing element that establish a cushioned physical union between the gearbox and the fixed frame, in order to guarantee absorption of the torque generated by the gearbox. The position of the absorbing elements is selected strategically, as they are placed between the two ridges to obtain a device with a symmetrical configuration, such that a first cushioning between the device and the protrusion of the gearbox through the first absorbing element and a second cushioning between the protrusion and the fixed frame through the second absorbing element occurs.

In this way, when vibrational oscillations occur in the gearbox this are transmitted to each protrusion of said box, passing through each torque absorber, where the first and second absorbing elements cushion said oscillations by transforming kinetic energy into elastic deformation energy.

In comparison with the prior art, there is a substantial simplification of the components of the torque absorber, as previously said absorber comprised three main components: brackets, bridges and absorbing elements. Instead, in the torque absorber for gearboxes of the invention the main components are reduced to the torque absorber comprising a single part with the pair of ridges, and the first and second absorbing elements, which in addition can be easily accessed by a skilled worker as they are located between the ridges, visible for on-site inspection and repair. In addition, in order to replace or substitute the absorber it is only necessary to release the torque absorber from each protrusion of the gearbox, which is a simple task requiring little operational time.

It is necessary to clarify the terms "first" and "second" absorbers, as this does not imply the need for a "third" absorber; the terms are used only to clarify the optional components used in addition to the basic and essential components of the torque absorber of the invention.

In a preferred embodiment the device is shaped as a C, where the wings correspond to the pair of ridges and the web corresponds to the central part. In this way, the handling and installation thereof on each protrusion of the gearbox is performed in a quick and effective manner, as the worker only needs to position the absorbing elements and couple each torque absorber from a side or from the top.

In this sense, the guiding and centring of the torque absorber with respect to the protrusion of the gearbox can be performed because the second absorber comprises at least one centring pin between said second absorber and the fixed frame. In addition, the coupling of the torque absorber on the corresponding frame is performed by physically joining the torque absorber and the frame, with several embodiment options existing for said second union, such as using securing bolts screwed in orifices made in said fixed frame. Said bolts will pass through the pair of ridges and be inserted in the frame to ensure mechanical coupling between said elements.

It should be recalled that, in order to increase the absorption capacity of the assembly, the presence is described of the second absorbing element coupled to the protrusion of the gearbox, in contact with both the fixed frame and said protrusion of the gearbox, configuring a cushioned union between the fixed frame and the corresponding torque absorber. This results in a sandwich type configuration where the protrusion is trapped between the first and second absorbing element, which is generally made of an elastomeric plastic material. This doubles the contact area between the protrusion and the absorbing elements, and therefore increases the torque cushioning and absorption response of the assembly.

Not that as in the known prior art there are dimensional and shape tolerance for the main components of the torque absorber, which must be corrected during the assembly and commissioning process of the torque absorber. For this purpose, a preferred alternative is described where the absorber comprises a plurality of gauges that can be placed between:

The first absorbing element and the torque absorber itself; and/or the second absorbing element and the fixed frame.

In this way, the gauges take advantage of the arrangement of the absorbers and are placed between potential free spaces left between these and the adjoining rigid surfaces: the base of the absorber and the fixed frame. The gauges can be accessed from the outside and inspected by a skilled worker. This greatly simplifies maintenance and repair tasks compared to the prior art as indicated above.

Lastly, as an example of an alternative embodiment an option is described in which each torque absorber is shaped as an E, where the first ridge corresponds to a central ridge shaped to be housed in a through orifice of each protrusion, and the outer ridges are shaped to act as second ridges, both coupled to the fixed frame, and where both second ridges externally embrace on both sides the corresponding protrusion of the gearbox.

The alternative embodiment shows that the union between the gearbox and the frame is achieved by each torque absorber comprising a single component, which has a first ridge inserted in the through orifice of each protrusion of the gearbox, and a second ridge that embraces the corresponding protrusion of the gearbox, coupled to the frame, resulting in the physical coupling from the gearbox to said frame that requires an absorbing element to ensure the absorption of the torque generated by the gearbox. For this reason, the presence of a first absorbing element placed at a strategic location with respect to the first ridge is also described, as said first absorbing element is coupled externally with respect to said first ridge and is constantly in contact with the base of the first ridge (where the first ridge emerges) and with the protrusion of the gearbox.

Thus, it can be seen that to install said torque absorber integrated on the gearbox it is only necessary to position each E-shaped torque absorber on the protrusion of said gearbox, such that the central ridge of the E is inserted in the through orifice of said protrusion, and the two ends of the E are at the flanks of said protrusion. In addition, the first and second absorbing element surround the free surface not embedded in the protrusion of the gearbox, guaranteeing a flexible connection between the gearbox and the association torque absorber. To physically join the torque absorber and the frame, the two end ridges of the E are provided with the aforementioned attachment means to said frame, and can be accessed from the top of the E shape on the face opposite that in which the ridges emerge.

Thus, in view of the preferred embodiment with a C shape, the present invention provides a torque absorber for wind turbine gearboxes that can absorb the reaction torque generated in the gearbox towards the wind turbine frame, such that there is always a cushioned union between the frame and said gearbox that ensures said absorption, by means of a series of simple, highly versatile elements that can be used in the various gearboxes of currently used wind turbines, and which greatly simplify maintenance, repair and replacement tasks for said torque absorber compared to the current state of the art associated with said solutions for absorbing the torque generated in wind turbine gearboxes.

DESCRIPTION OF THE DRAWINGS

To complete the description being made, and in order to aid a better understanding of the characteristics of the invention according to a preferred example of a practical embodiment thereof, a set of drawings are provided that form an integral part of this description where, for purposes of illustration and in a non-limiting sense, the following is shown.

PREFERRED EMBODIMENT OF THE INVENTION

Figure 1:
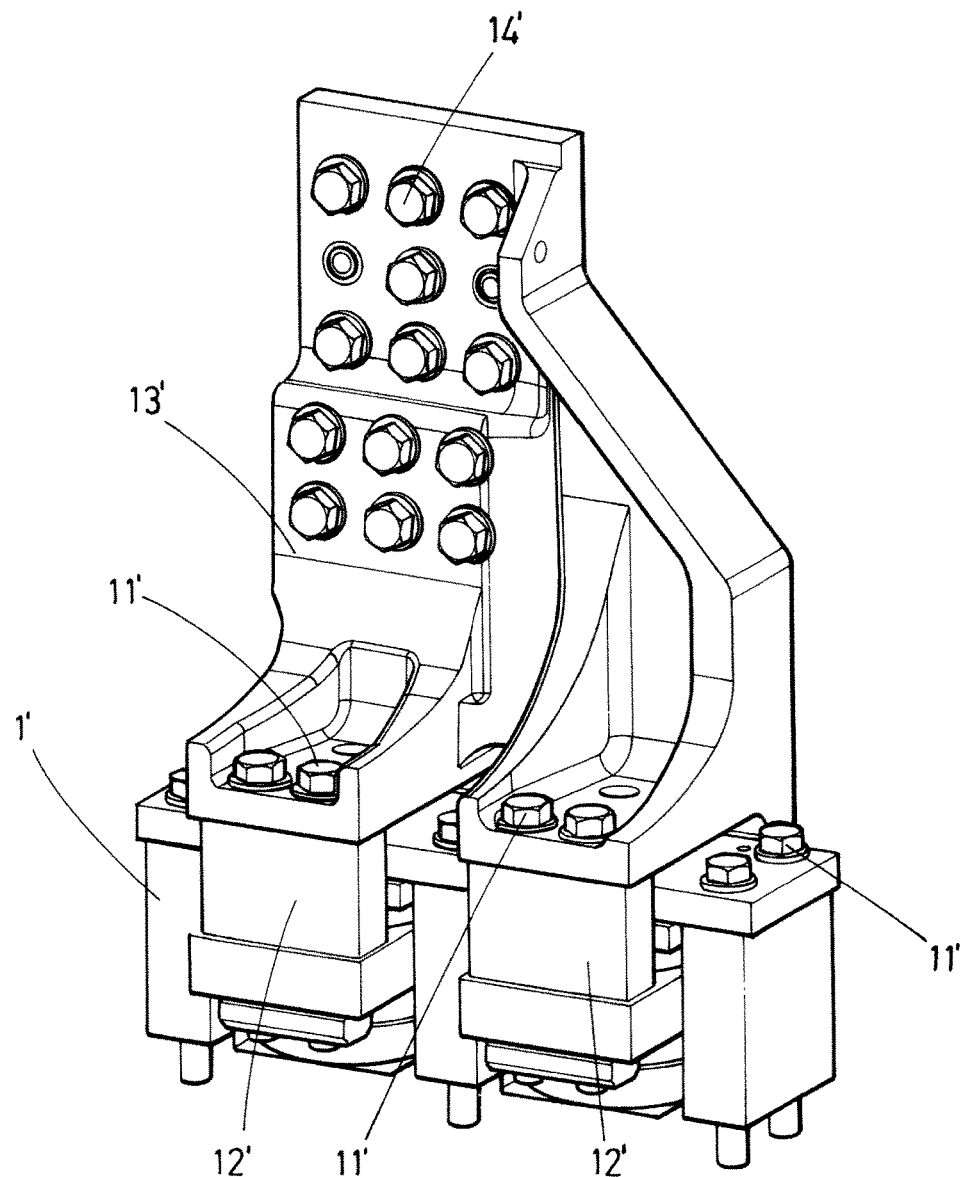
FIG. 1 shows a three-dimensional view of a torque absorber corresponding to the prior art, showing the associated brackets, bridges, absorbing elements and spacers.
Figure 2:
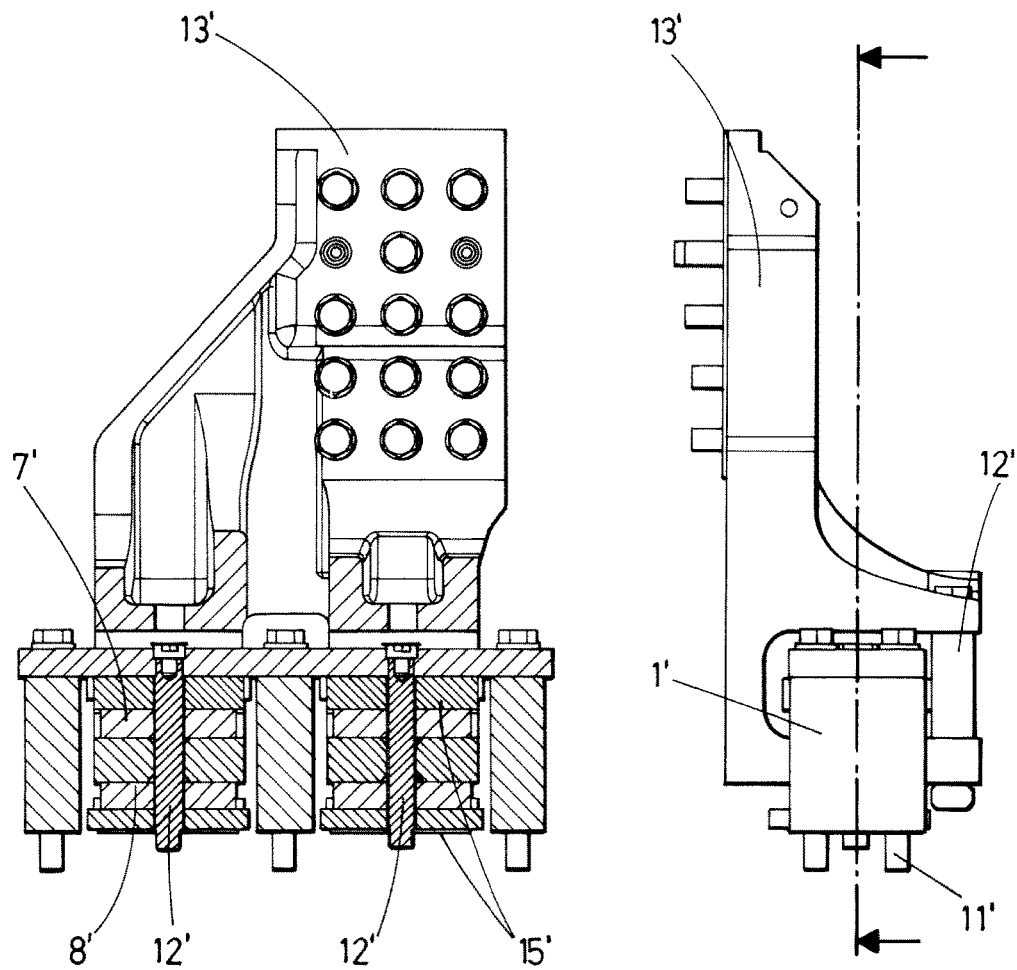
FIG. 2 shows two two-dimensional views of the torque absorber of FIG. 1, also corresponding to the prior art.

FIGS. 1 and 2, which correspond to torque absorbers currently used, which therefore belong to the prior art, show that the torque absorbers comprise:

A bracket (13') bolted by a plurality of bolts (14') to the casing of a gearbox.

A bridge (1') bolted to the frame by corresponding bolts (11'), and between the two components are arranged the absorbers (7', 8') that absorb part of the torque generated in the gearbox, preventing said torque from being transmitted to the bridges (1') and thereby to the corresponding frame.

In addition, the position is shown of a series of front spacers (12') meant to set a predefined height of the bracket (13') with respect to the bridge (1'). However, said front spacers (12') are not the only parts in charge of setting said height; as seen in FIG. 2, there are internal spacers (15') with the same purpose in the torque absorber.

To achieve a flexible union between the gearbox and the corresponding frame, FIG. 2 shows the position of the absorbers (7', 8') internal to the bridge (1'), composed of two pairs of absorbers, each pair comprising an upper absorber (7') and a lower absorber (8'), distributing the load generated by the gearbox torque on the contact surfaces of the absorbers (7', 8').

In addition, there are some gauges (15') present in correspondence with the lower absorbers (8'), and centring pins (12') with respect to the corresponding frame.

Accordingly, the problem related to the large number of parts used to obtain said torque absorber can be seen more clearly and in a visual manner, as well as that related to the difficulty for a skilled worker to reach the absorbers (7', 8') and the gauges (12') to check their condition during routine maintenance tasks.

Figure 3:
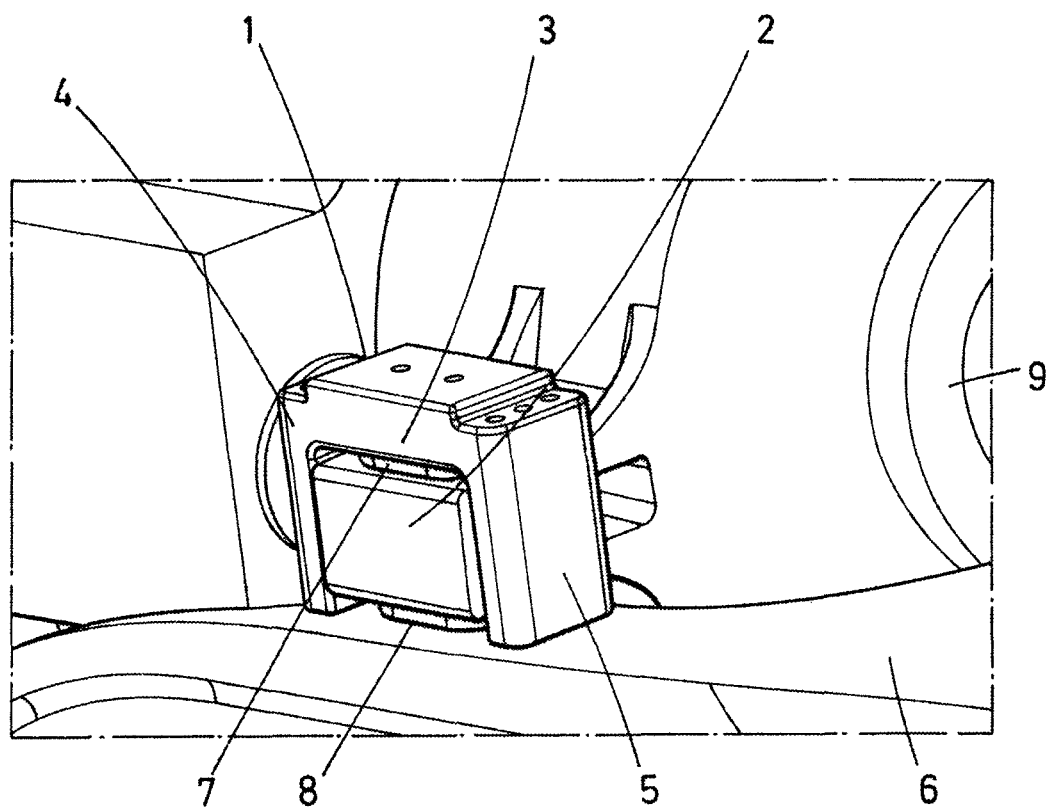
FIG. 3 shows a first three-dimensional view of the torque absorber for gearboxes of the invention, coupled to a protrusion of the gearbox itself.
Figure 4:
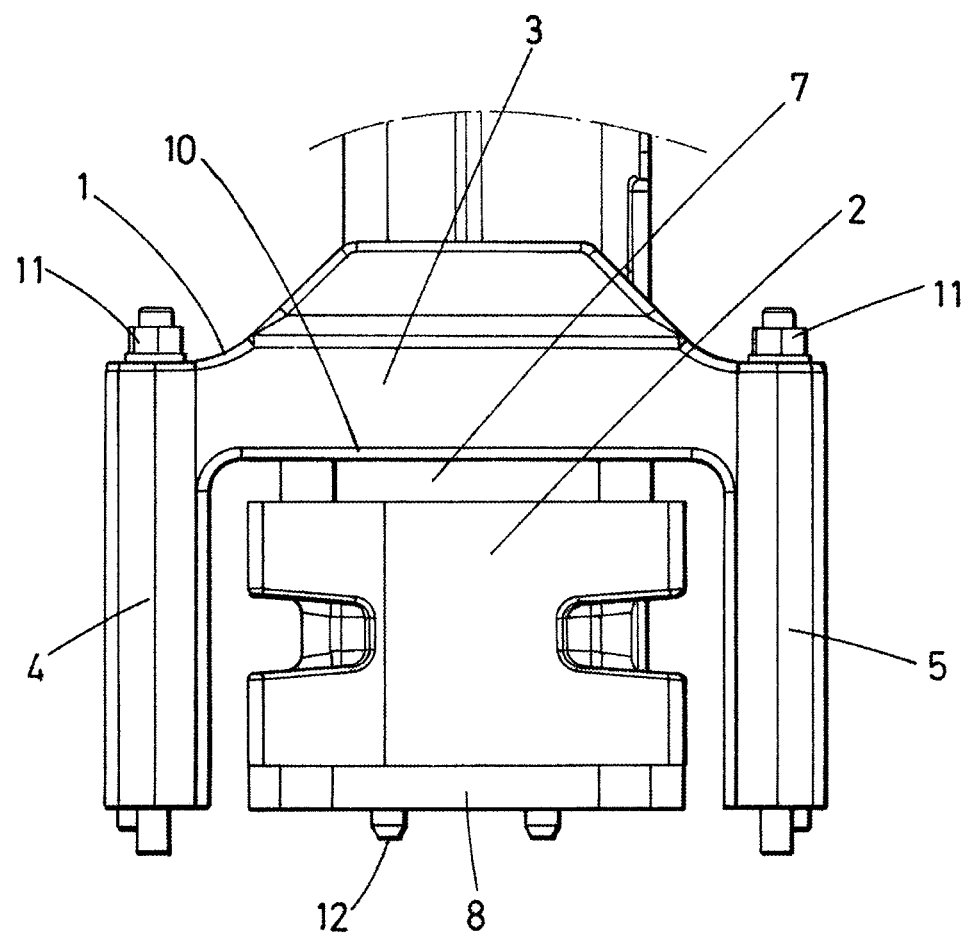
FIG. 4 shows a two-dimensional view of the torque absorber to couple to the gearbox, revealing the union elements and the pins for centring with respect to the frame to couple.
Figure 5:
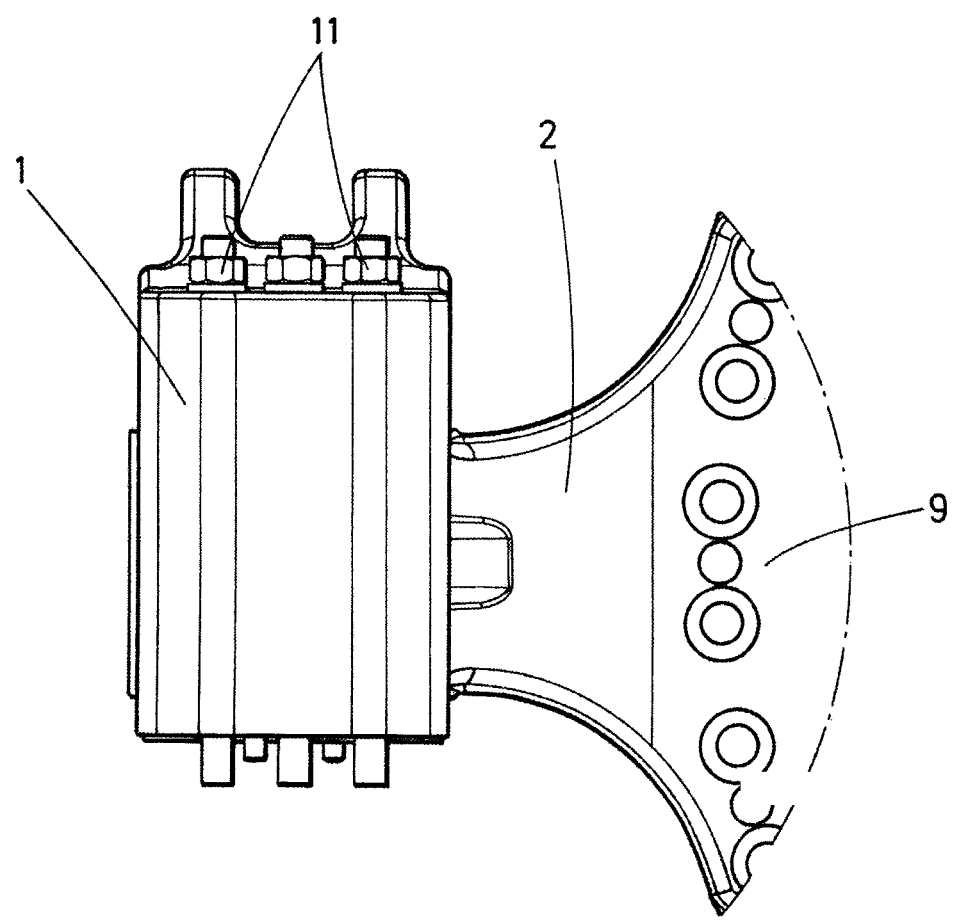
FIG. 5 shows a two-dimensional view of the torque absorber coupled to the gearbox through the corresponding protrusion thereof.

To solve said problems, FIGS. 3 to 5 show that the torque absorber for wind turbine gearboxes of the invention comprises:

Regarding the gearbox (9) a protrusion (2) of the gearbox (9) is displayed,

Regarding the torque absorber (1) it is configured to be coupled on one side to a pair of corresponding protrusions (2) of a gearbox (9) and on the other side to a fixed frame (6).

In addition, each torque absorber (1) is shaped as a C, comprising two ridges (4, 5) that embrace the protrusion (2) resulting in an external clamping of said protrusion (2) of the gearbox (9) is displayed.

The torque absorber (1) is coupled to the fixed frame (6) by a series of securing bolts (11) to be threaded in orifices made in said fixed frame (6); where said securing bolts (11) pass through the second ridges (4, 5) of the torque absorber (1).

To secure the cushioned union, each torque absorber (1) has a first absorbing element (7) located between the ridges (4, 5) and in contact with both the torque absorber (1) and said protrusion (2) of the gearbox (9), defining a cushioned union between each protrusion (2) and the corresponding torque absorber (1) through said first absorbing element (7). In addition, there is a second absorbing element (8) located between said ridges (4, 5) in contact with both the torque absorber (1) and the fixed frame (6), defining a cushioned union between each protrusion (2) and the fixed frame (6) through said second absorbing element (8).

To overcome any shape errors in the involved parts, the figures show the presence of a plurality of gauges (10) to couple between the second absorbing element (8) and the fixed frame (6), and between the first absorbing element (7) and the base of the central part (3) of the C-shaped absorber, which can be easily accessed and seen from the outside.

Lastly, in view of FIG. 4 it can be seen that the second absorber (8) comprises a pair of centring pins (12) between the second absorber (8) and the fixed frame (6), which allow positioning the absorber of the invention.

Based on this description and the set of figures, the skilled in the art may understand that the embodiments of the invention as described can be combined in multiple ways within the scope of the invention. The invention has been described according to some preferred embodiments thereof, but for the skilled in the art it shall be evident that multiple variations can be entered in said preferred embodiments without exceeding the scope of the invention claimed.

The invention claimed is:

1. A torque absorber for coupling a protrusion of a wind turbine gearbox to a main frame, the torque absorber comprising:
    (a) a torque absorber frame comprising first and second ridges connected by a central part;
    (b) a first absorbing element;
    (c) a second absorbing element; and
    (d) means for securing the torque absorber frame to the main frame;
the torque absorber being configured and arranged to couple the protrusion of the gearbox to the main frame with the first absorbing element sandwiched between a bottom of the central part and a top of the protrusion, with the second absorbing element sandwiched between a bottom of the protrusion and a surface of the main frame, and with the torque absorber frame and main frame encircling the first and second absorbing elements and the protrusion while leaving visible an unobstructed side view of the protrusion and the first and second absorbing elements, wherein the first and second ridges are parallel to each other and the central part is disposed transverse to the first and second ridges, and wherein the second absorbing element comprises at least one centering pin disposed on a bottom of the second absorbing element.

2. The torque absorber according to claim 1, wherein the means for securing comprises fasteners that pass through respective orifices in the first and second ridges whereby the means for securing does not obstruct the side view.

3. The torque absorber according to claim 2, wherein the fasteners comprise bolts that are screwed in the orifices in the absorber frame.

4. An apparatus comprising the torque absorber according to claim 1 coupling the protrusion of the gearbox to the main frame.

5. A torque absorber for coupling a protrusion of a wind turbine gearbox to a main frame, the torque absorber comprising:
   (a) a torque absorber frame comprising first and second ridges connected by a central part;
   (b) a first absorbing element;
   (c) a second absorbing element; and
   (d) means for securing the torque absorber frame to the main frame;

the torque absorber being configured and arranged to couple the protrusion of the gearbox to the main frame with the first absorbing element sandwiched between a bottom of the central part and a top of the protrusion, with the second absorbing element sandwiched between a bottom of the protrusion and a surface of the main frame, and with the torque absorber frame and main frame encircling the first and second absorbing elements and the protrusion while leaving visible an unobstructed side view of the protrusion and the first and second absorbing elements, wherein the first and second ridges are parallel to each other and the central part is disposed transverse to the first and second ridges, the torque absorber further comprising a gauge for adjusting tolerances between the torque absorber and the protrusion.

6. The torque absorber according to claim 5, wherein, with the torque absorber coupling the protrusion to the main frame, the gauge is disposed between the torque absorber frame and the protrusion, and is visible in the side view.

* * * * *